United States Patent [19]

Araujo

[11] Patent Number: 5,007,948
[45] Date of Patent: Apr. 16, 1991

[54] ESSENTIALLY COLORLESS SILVER-CONTAINING GLASSES THROUGH ION EXCHANGE

[75] Inventor: Roger J. Araujo, Big Flats, N.Y.

[73] Assignee: Corning Incorporated, Corning, N.Y.

[21] Appl. No.: 495,081

[22] Filed: Mar. 19, 1990

[51] Int. Cl.$^5$ .............................................. C03C 21/00
[52] U.S. Cl. .................................... 65/30.13; 65/3.14; 350/96.34; 350/164; 501/13; 501/78
[58] Field of Search ................... 501/78, 13; 65/30.13, 65/3.14; 350/96.34, 164

[56] References Cited

U.S. PATENT DOCUMENTS 3,703,388 11/1972 Araujo et al. ...................... 501/78 X
3,765,913 10/1973 Murakami et al. ............... 501/78 X
3,873,408 3/1975 Hensler ............................ 65/30.13 X
4,108,621 8/1978 Asahara et al. .................... 65/30.13
4,191,547 3/1980 Wu ................................. 65/30.13 X Primary Examiner—Robert L. Lindsay
Attorney, Agent, or Firm—C. S. Janes, Jr.

[57] ABSTRACT

This invention relates to the production of an essentially colorless alkali meal oxide-$Al_2O_3$ and/or $B_2O_3$-$SiO_2$, wherein at least a portion thereof contains silver ions resulting from an ion exchange reaction wherein $Ag^+$ ions from an external source are exchanged with alkali metal ions in the glass. The amount of exchange can be varied across a portion of the glass to impart a gradient in refractive index thereto. Such technology is especially suited to the optical engineering field, particularly the making of high performance fiber-optic components.

8 Claims, No Drawings

ESSENTIALLY COLORLESS SILVER-CONTAINING GLASSES THROUGH ION EXCHANGE

BACKGROUND OF THE INVENTION

This invention has for a specific objective the production of gradients in the refractive index of glass articles through the use of ion exchange techniques, such technology being applicable to the optical engineering field, particularly the making of high performance fiber optic components.

The current interest in making high performance fiber optic components has led to a resurgence of efforts to further pursue optical engineering technologies. One such technology being developed combines ion exchange techniques with photolithography for integrating optical waveguides in a glass substrate. Optical waveguides can be embedded in a glass substrate to create a wide variety of optical circuits and passive optical functions for devices such as splitters, stars, wavelength division multiplexers, and optical power taps. These functions are readily integrated into a single glass substrate to facilitate component miniaturization and controlled performance.

Such research was presented by Kaps, Karthe, Muller, Possner, and Schreiler in "Glasses for Optoelectronics," *ECO Proceedings*, Paris, France, Vol. 1128, Apr. 24-27, 1989, wherein a special glass type that is favorable for silver-sodium ion exchange is described. This special glass is used for fabricating channel waveguides and waveguide devices whereby the glass substrate is covered with a metal film. Patterns are generated by photolithography and a wet etching technique using electron beam written masks.

Ion exchange, a technique for producing gradients in the refractive index of glass articles, has been in use since the early sixties. The essence of this method lies in the exchange of ions having different polarizabilities, viz., exchanging one alkali ion for another. For example, U.S. Pat. Nos. 3,524,737 and 3,615,322 describe glass strengthening techniques whereby the sodium ion in glass is replaced by potassium and copper ions, respectively. Similarly, U.S. Pat. No. 3,615,323 describes a similar glass strengthening technique, yet with the sodium ion being replaced by a lithium ion. Modest changes in refractive index are achieved by such exchanges.

Thallium has commonly been chosen over other elements as a doping ion to create regions with a higher refractive index. Large changes in the refractive index of glasses have been achieved by the ion exchange of thallium; however, the use of thallium is limited to some extent by its toxicity. Nevertheless, thallium is the ion most often used today in ion exchange processes in spite of its inherent toxicity problems.

The instant invention discloses a promising alternative to thallium in creating large gradients in the refractive index of silica-based glasses—the exchange of $Ag^+$. The exchange of silver for an alkali metal produces a change in refractive index comparable to that produced by the thallium exchange, yet without the inherent toxicity problems. The potential advantages of this exchange have not been previously realized because the introduction of more than minimal amounts of silver into a silicate glass by ion-exchange techniques has invariably led to extensive chemical reduction of silver, with attendant increase in attenuation in the optical path. Hence, the intense color which characterizes the formation of colloids when silver is reduced is unacceptable for optical waveguide applications and, indeed, for most optical applications where an essentially colorless, transparent glass is required.

From the studies on silver dissolved in borosilicate glass, particularly in the photochromic glasses, it can be deduced that reduction of silver ions can result from the extraction of electrons intrinsic to the glass network. Furthermore, the relative ease with which this extraction occurs varies strongly with the composition of the glass. Indeed, glasses were found in which no reduction occurred.

Polyvalent impurities such as arsenic or tin can, of course, provide electrons leading to the reduction of a small amount of silver and consequently can cause a small degree of coloration. It is unrealistic, however, to believe that the small levels of impurities typically found in these glasses can be responsible for the considerable coloration observed in alkali silicate glasses upon the introduction of modest amounts of silver. Moreover, scrupulous efforts to exclude polyvalent ions from the glass failed to prevent extensive silver reduction. It is therefore an object of this invention to provide a prescription for making glasses in which the physical properties can be varied within moderately wide limits, but in which the amount of silver reduction does not exceed that caused by polyvalent ion impurities.

DESCRIPTION OF THE INVENTION

The basic product of the present invention is an essentially colorless, silver-containing, alkali metal oxide-$Al_2O_3$ and/or $B_2O_3SiO_2$ glass produced through an ion exchange reaction wherein $Ag^+$ ions from an external source are exchanged with alkali metal ions in a glass having a base composition wherein the alkali metal oxide and the $Al_2O_3$ and/or $B_2O_3$ are present in such concentrations that the glass possesses an atomic structure in which the fraction of non-bridging oxygen atoms is less than 0.03.

The method of making that glass is comprised of the following steps:

a. forming a glass article having a base composition in the alkali metal oxide-$Al_2O_3$ and/or $B_2O_3$-$SiO_2$ system wherein the alkali metal oxide and $Al_2O_3$ and/or $B_2O_3$ are present in such concentrations that the glass possesses an atomic structure in which the fraction of non-bridging oxygen atoms is less than 0.03; and then b. contacting said article with an external source of $Ag^+$ ions at a temperature of about 350°-750° C. for a sufficient period of time to replace at least a portion of the alkali metal ions with $Ag^+$ ions on a one-for-one basis.

In that region of the glass article subjected to the ion exchange reaction, the refractive index will be changed. Accordingly, by varying the area of the glass exposed and the time of exposure to the ion exchange reaction, it is possible to impart a gradient in refractive index to the glass.

PRIOR ART

A variety of ion exchange techniques have been documented in the art. The general methodology utilized in such techniques involves the substitution of alkali ions of one size for those of another. For example, U.S. Pat. Nos. 3,681,041 and 3,533,888 disclose a process for strengthening glass articles utilizing an ion exchange technique wherein smaller ions are substituted for larger ones. Conversely, U.S. Pat. No. 3,790,430 describes a process for strengthening glass articles through an ion exchange process wherein alkali metal ions in a surface of a glass article are replaced by larger monovalent metal ions. U.S. Pat. Nos. 3,687,649, 3,628,934, and 3,615,320 disclose similar techniques wherein larger alkali ions are substituted for smaller alkali ions. A number of more specific variations of ion exchange is exhibited in U.S. Pat. No. 4,053,679 wherein a potassium ion is exchanged into opal glass, and U.S. Pat. Nos. 3,524,737, 3,615,322, and 3,615,323 mentioned previously, whereby the sodium ion in soda-lime type glasses is replaced with potassium, copper, and lithium ions, respectively.

None of these references, however, mentions ion exchange of silver. Also, no mention of the manipulation of the fraction of non-bridging oxygen is made.

The focus of the instant invention is to manipulate the non-bridging oxygen atoms in a glass so that silver ions can be incorporated therein without coloring the glass. The use of silver in ion exchange is well documented, yet with little success in producing glass articles with little or no coloration. However, those references make no mention of manipulating the number of non-bridging oxygens to produce colorless glass articles when silver is ion exchanged. For example:

The previously mentioned technical paper authored by Kaps et al. describes a special glass type that is favorable for silver-sodium ion exchange, this aluminoborosilicate glass being comprised of 25 mole % $Na_2O$, 25 mole % $Al_2O_3$, 37.5 mole % $SiO_2$, and 12.5 mole % $B_2O_3$. The exchange experiment was carried out at a temperature of 400° C. for 1 hour in a pure silver nitrate salt melt as well as several other diluted salt melts. Manipulation of the fraction of non-bridging oxygen atoms is not mentioned.

U.S. Pat. No. 3,425,816 describes a method for chemically strengthening alkali metal silicate glasses through an ion exchange reaction employing a bath of molten alkali metal salt to avoid coloration of the glass by silver ions present in said bath, wherein the silver ions are complexed by adding about 0.5–25 per cent by weight of a material capable of providing an ion selected from the group consisting of chloride, bromide, iodide, cyanide, phosphate, and chromate to the bath to inhibit migration. Manipulation of the number of non-bridging oxygen atoms is not mentioned.

U.S. Pat. No. 3,484,224 discloses a method of strengthening glass, particularly soda-lime glass, without the development of any yellow color, by a process of etching and cation exchange in melt systems; the cation exchange, silver-for-sodium, taking place in systems containing silver ions and other cations in which at least 90 per cent of the total cations are sodium ions. Manipulation of the number of non-bridging oxygen atoms is not mentioned.

U.S. Pat. No. 3,495,963 details a method of treating glass by simultaneous multiple exchange of ions from the same treating bath to color and strengthen a base glass which comprises contacting said glass with a molten mixture comprising from about 50 to about 99.5 per cent by weight of an alkali metal salt selected from the class consisting of sodium and potassium salts, and from about 0.5 to 50 per cent by weight of a silver metal salt. Manipulation of the fraction of non-bridging oxygen atoms is not mentioned.

U.S. Pat. No. 3,287,201 describes a method of strengthening an alkali metal containing glass which comprises replacing the alkali metal ions in a surface of the glass by smaller electropositive metal ions selected from the group consisting of the ions of alkali metals, copper, silver, and hydrogen. Manipulation of the number of nonbridging oxygen atoms is not mentioned.

U.S. Pat. No. 4,108,621 discloses a method of producing a soft aperture filter comprising heating a glass having a base composition of 55–72 mole % $SiO_2$, 15–35 mole % $Na_2O$, 0–5 mole % divalent oxides other than ZnO, 4–15 mole % ZnO, 0–5 mole % $Al_2O_3$ with $Sb_2O_3$ and/or $As_2O_3$, in a fused bath containing 14–60 mole % silver salt, and optionally, $NaNO_3$ and/or $Na_2SO_4$. Manipulation of the number of non-bridging oxygen atoms is not mentioned.

U.S. Pat. No. 4,022,628 details an ion exchange-strengthened silicate glass filter and a method for making such via incorporating cerium oxide into the glass followed by ion-exchange strengthening using a mixture of potassium salt and silver nitrate. Manipulation of the fraction of non-bridging oxygen atoms is not mentioned.

U.S. Pat. No. 3,508,895 describes a method of strengthening a soda-lime glass body by producing a compressive layer on the order of at least 2 to 3 microns in depth at the surface of the body to strengthen the same; the viscosity of said surface layer being altered by substituting fluorine ions for non-bridging oxygen ions and/or hydroxyl ions to a sufficient depth to produce a surface layer of more viscous glass of a thickness sufficient to provide a compressive stress layer. Nevertheless, manipulation of the number of non-bridging oxygen atoms for the purpose of avoiding silver reduction is not mentioned.

U.S. Pat. No. 3,873,408 discloses a method of increasing the refractive index of a surface layer of predetermined depth of a glass body comprising the step of maintaining the body in contact with a molten source of ions for at least 1 hour at a temperature between 800° and 1100° F, the ions being selected from the group consisting of silver, thallium, and copper ions, and mixtures thereof. Manipulation of the fraction of non-bridging oxygen atoms is not mentioned.

DESCRIPTION OF PREFERRED EMBODIMENTS

One specific embodiment of the present invention is the glass article and method of making such wherein (a) up to 7.5 cation per cent $Al_2O_3$ and/or $B_2O_3$ is replaced with at least one metal oxide selected from the group consisting of BeO, CaO, MgO, ZnO, $Ga_2O_3$, $La_2O_3$, $Nb_2O_5$, $Ta_2O_5$, $Yb_2O_3$, and $ZrO_2$, while maintaining the fraction of non-bridging oxygen atoms at less than 0.03, and (b) said glass article is contacted with a source of $Ag^+$ ions at a temperature between 400° and 600° C. for a period of time between 2 and 24 hours.

The nature of the invention will be more easily comprehended if a few facts about bonding in glass are understood. In amorphous silica each oxygen atom is covalently bonded to two silicon atoms and is therefore called a bridging oxygen atom. When ionic oxides such as alkali metal oxides are added to silica, some non-bridging oxygen atoms are formed. These are oxygen atoms that are covalently bonded to only one silicon atom and, hence, bear a negative charge (an electron) which must be compensated by a vicinal positively charged ion such as the alkali ion. The inventor has discovered that it is this electron responsible for the negative charge observed on non-bridging oxygen atoms which can be extracted by silver ions to produce silver colloids.

Certain very small highly charged positive ions, the most notable of which is the aluminum ion, are most stable in a glass when they are surrounded by four oxygen atoms, thereby creating an environment which has tetrahedral symmetry. The bonds between the high field strength ion, i.e., the highly charged positive ion, and its four oxygen neighbors are highly covalent. If the formal charge, which has been designated in the scientific literature as Z, of the high field strength ion is less than four, then a negative charge of 4-Z must be distributed over the four neighboring oxygen atoms. Such a bonding arrangement, in effect, removes non-bridging oxygen atoms from the system. The removal of non-bridging oxygen atoms and the formation of tetrahedrally coordinated aluminum ions, when alumina is added to an alkali silicate glass, has been universally recognized for many years. The present inventor discovered that silver ions cannot extract an electron from the oxygen atoms bonded to aluminum. The reason for this, presumably, is the fact that the electron associated with a tetrahedrally bonded aluminum atom is much more delocalized than that associated with a non-bridging oxygen and, hence, is more stable. In addition to aluminum, trivalent gallium and ytterbium exhibit this behavior when introduced in modest amounts ($\approx 7.5$ cation %) into silicate glasses containing large amounts of alkali. As shall be shown below, even trivalent lanthanum, in spite of its large size, seems to exhibit this behavior.

Niobium and tantalum show analogous behavior. Even though these ions do not exist in an environment with tetrahedral symmetry in silicate glasses, their high field strength, in effect, removes non-bridging oxygen atoms from the system. Thus, the use of any of these ions or the use of several of them in combination will have the effect of diminishing the number of non-bridging oxygen atoms.

To illustrate the efficacy of the instant invention, silver was introduced into several glasses containing varying ratios of alumina to alkali by an ion exchange technique. According to the principles of glass structure outlined above, the fraction of oxygen atoms in an alkali alkaline earth aluminosilicate glass which are bonded into the structure as non-bridging oxygen (NBO) atoms is given by the equation, $$NBO = (M_2O + 2MO - Al_2O_3)/(2SiO_2 + 1.5Al_2O_3 + MO + 0.5M_2O),$$

where all the concentrations are expressed in cation percent. ($M_2O$ designates a monovalent metal oxide and MO represents a divalent metal oxide.) This equation accurately describes the fraction of non-bridging oxygen atoms in silicates, wherein lanthanum, ytterbium, zirconium, hafnium, niobium, or tantalum may be used to replace some of the alumina, and wherein a negative sign multiplies the coefficient of the alkaline earth when magnesium, calcium or zinc is used.

However, in borosilicates the fraction of non-bridging oxygen atoms must be interpolated from other sources, such as the work of Y.H. Yun and P.J. Bray, in "Nuclear Magnetic Resonance Studies of Glasses in the System $Na_2O-B_2O_3-SiO_2$," *Journal of Non-Crystalline Solids*, Vol. 27, pp. 363–380 (1978) and of R.J. Araujo and J.W.H. Schreurs in "Tetrahedral Boron in Sodium Aluminoborate Glasses," *Physics and Chemistry of Glasses*, Vol. 23, pp. 108–109 (1982). The structures of borates and borosilicates at room temperature have been well studied by the use of nuclear magnetic resonance and the number of non-bridging oxygen atoms in borosilicates is easily determined by reference to such studies. These workers found that the number of non-bridging oxygen atoms is well correlated to a special ratio, R, which is defined by the equation $$R = (M_2O - Al_2O_3)/B_2O_3$$

where all the concentrations are expressed in cation percent. The ratio of tetrahedral boron atoms to non-bridging oxygen atoms bonded to boron atoms depends on temperature; but at temperatures normally used for ion exchange, the dependence is very weak and usually may be ignored.

All of the glasses listed in Table 1 were immersed in molten silver chloride at a temperature of 500° C. for ten days. Diffusion of silver throughout the thickness of the sample is expected to be complete and the amount of silver introduced represents its equilibrium value. Since no concentration gradients are expected to result from such a long immersion, the change in refractive index as a function of the amount of silver introduced is easily determined. Furthermore, the coloration observed represents the worst possible case. In any application wherein a gradient in silver concentration is desired, the total silver introduced into the sample would be less than that found in the present samples.

EXAMPLE 1

Extensive reduction of the silver in glass #1 was indicated by a deep magenta color when the sample was viewed in transmitted light, and by a green color when the sample was viewed in reflected light. Microscopic examination indicated the existence of a plethora of gaseous inclusions. Mass spectrometry disclosed no evidence that the bubbles contained chlorine. Thus, one can rule out the possibility that chloride ions diffusing into the glass concurrently with the exchange of cations provided the electrons for the reduction of silver. Consistent with the thesis that the non-bridging oxygen atoms supply the electrons, was the observation that the bubbles contained primarily oxygen. Observation of small amounts of nitrogen in some of the bubbles has not been explained.

EXAMPLE 2

Glass #2 was melted to provide a sample with somewhat fewer, but nonetheless a plentiful supply of, non-bridging oxygen atoms. After it had been subjected to ion exchange, the sample was black and contained large shiny specks that appeared to be metallic silver. The sample appeared to have crystallized extensively.

EXAMPLE 3

Glass #3 was melted to provide a glass with still fewer non-bridging oxygen atoms than were possessed by the previous glasses. Nevertheless, extensive reduction of silver is observed.

EXAMPLE 4

In glass #4 only slightly more than 1% of the oxygen atoms are of the non-bridging type. Ion exchange of this glass resulted in several small areas which manifested a red color much paler than that seen in sample #1. Furthermore, no scattered green light was observed nor were any gas bubbles present. The largest fraction of the glass displayed only a pale yellow color. Microprobe examination revealed that about 18% of the alkali had been replaced by silver in either area.

EXAMPLE 5

Glass #5 was designed to contain an amount of alumina exactly equal to the total alkali in an attempt to completely eliminate the non-bridging atoms. Ion exchange produced areas that were pale yellow and areas that were completely colorless. Once again, microprobe examination failed to identify any difference in the degree of ion exchange in different areas. In this glass 23% of the sodium ions were replaced by silver ions as a result of the ion exchange. Considering the large amount of silver (5.1 cation %) in this glass, the amount of coloration is small indeed. These observations are taken as strong support for the thesis that non-bridging oxygen atoms were instrumental in producing the extensive silver reduction always observed in previous experiments. The negligible yellow color observed in some areas might be attributable to reduction by traces of polyvalent ions. Spark spectra analysis indicated a level of iron between 0.003 and 0.01 weight per cent.

EXAMPLE 6

In an attempt to demonstrate that silver would not be reduced when the fraction of non-bridging oxygen atoms was kept sufficiently low no matter which alkalis were present, glass #6 was melted. In spite of an alkali content very slightly in excess of the alumina, the glass was completely colorless after ion exchange. The silver content exceeded 17% by weight and produced a refractive index change of 0.042. The alkalis differed in their tendency to be replaced by silver. Five per cent of the lithium, eight percent of the sodium and thirty-eight per cent of the potassium ions were replaced.

EXAMPLE 7

A second sample of this glass was ion-exchanged at 650° C. In this latter sample, the silver content after ion exchange exceeded 23% by weight. The refractive index change caused by the replacement of alkalis with silver was 0.06. About fifteen per cent of the sodium and lithium and about fifty-five per cent of the potassium ions were replaced in this experiment. The increased amount of exchange is, of course, not related to larger diffusion coefficients, since the samples were uniformly exchanged throughout in any case. Rather, it indicates that the chemical potential of the alkalis in the molten silver halide decreases as the temperature increases.

EXAMPLE 8

To test the influence of the anion in the salt bath, a third sample was immersed in a salt bath comprised of 70% by weight of silver chloride and 30% of silver sulfate. In this case, approximately 90% of the alkalis was replaced. A refractive index change of 0.132 was produced. All of the exchange treatments of this glass produced samples that were virtually colorless.

EXAMPLE 9

A series of sodium aluminosilicates characterized by various concentrations of non-bridging oxygens was ion-exchanged at 400° C. for two hours in a bath of molten AgCl. The amount of silver introduced into the glasses by this treatment is not uniform through the thickness of the glass and is much lower than the amounts introduced into the glasses cited in Table 1. This experiment involves levels of silver more typical of those required to produce index gradients for many applications. The experiment was performed primarily so that only slight amounts of coloration were produced, thus permitting the measurement of visible absorption spectra. The intensity of the spectra is indicated in the Table 2 by citing the wavelength at which fifty per cent of the light is absorbed. The longer this wavelength, the more intense is the absorption. The first two glasses show only very slight yellow coloration consistent with the short wavelength cutoff [λ(0.5)]. Sample #10 is a noticeably darker yellow. Sample #11 is a very deep yellow, sample #12 is orange and sample #13 is dark brown. Thus, a very clear relationship is established between the degree of silver reduction and the number of non-bridging atoms in these simple glasses.

TABLE 1

| Sample | (Amount in Cation Percent) | | | | | | |
|---|---|---|---|---|---|---|---|
| | 1 | 2 | 3 | 4 | 5 | 6 | 7 |
| $SiO_2$ | 53.50 | 40.50 | 40.00 | 37.50 | 35.00 | 37.50 | 35.00 |
| $Al_2O_3$ | 7.00 | 20.00 | 27.50 | 30.00 | 32.25 | 31.25 | 32.25 |
| $Li_2O$ | — | — | — | — | — | — | 7.00 |
| $Na_2O$ | 39.50 | 39.50 | 32.50 | 32.50 | 32.75 | 31.25 | 1.00 |
| $K_2O$ | — | — | — | — | — | — | 24.75 |
| NBO | 0.237 | 0.149 | 0.036 | 0.013 | 0.004 | 0.000 | 0.004 |
| Color | magenta/green | black | black/bronze | red/yellow | clear | pale yellow | clear |

TABLE 2

| Sample | (Amount in Cation Percent) | | | | | |
|---|---|---|---|---|---|---|
| | 8 | 9 | 10 | 11 | 12 | 13 |
| $SiO_2$ | 35.00 | 37.50 | 55.00 | 45.00 | 55.00 | 45.00 |
| $Al_2O_3$ | 32.50 | 30.00 | 17.50 | 22.50 | 15.00 | 20.00 |
| $Na_2O$ | 32.50 | 32.50 | 27.50 | 32.50 | 30.00 | 35.00 |
| NBO | 0.000 | 0.018 | 0.067 | 0.071 | 0.102 | 0.109 |
| λ(0.5) | 395 | 398 | 418 | 450 | 534 | 627 |

The relationship between the amount of silver reduction and the fraction of non-bridging oxygen atoms is equally valid in borosilicate glasses, albeit the calculation of the number of non-bridging oxygen atoms is somewhat more complicated. Table 3 illustrates the relationship observed in borosilicate glasses utilizing an ion exchange conducted for two hours in a bath of molten AgCl at a temperature of 400° C. Samples #14, #15, and #16 are examples of essentially colorless, silver-containing, alkali metal oxide-$Al_2O_3$ and borosilicate glass whose properties have been improved by the ion exchange of silver into a borosilicate glass having an R value (as defined above) that is no higher than 1. More specifically, the properties of such glasses may be improved by the introduction of silver ions into a borosilicate glass containing at least 45 cation percent silica, at most 15 cation per cent alumina, and having an R value that is not greater than 0.6. The first two glasses appear to the naked eye to be completely colorless while a very pale yellow color can be detected in sample #16. A deep orange color is observed in sample #17. It is not known whether the shift in λ(0.5) in sample #15 is due to polyvalent ion impurities or to a slight error in the estimated value of NBO introduced by assuming the temperature of ion exchange to lie within the realm of the low temperature limit.

TABLE 3

| Sample | (Amount in Cation Percent) | | | |
|---|---|---|---|---|
| | 14 | 15 | 16 | 17 |
| $SiO_2$ | 50.00 | 50.00 | 50.00 | 50.00 |
| $Al_2O_3$ | 15.00 | 5.00 | 15.00 | 15.00 |
| $B_2O_3$ | 15.00 | 25.00 | 10.00 | 5.00 |
| $Na_2O$ | 20.00 | 20.00 | 25.00 | 30.00 |
| R value | 0.330 | 0.600 | 1.000 | 3.000 |
| NBO | 0.000 | 0.000 | 0.027 | 0.103 |
| λ(0.5) | 318 | 340 | 380 | 525 |

The effect of temperature upon the fraction of non-bridging oxygen atoms is discussed by R.J. Araujo in two articles published in the *Journal of Non-Crystalline Solids* entitled "Statistical Mechanics of Chemical Disorder: Application to Alkali Borate Glasses," 58, pp. 201-206 (1983) and "The Effect of Quenching on the Color of Glasses Containing Copper," 71, pp. 227-230 (1985).

Very high temperatures were required to melt the silicate glasses in which the number of non-bridging oxygen atoms was very low. Lower melting glasses having few or no non-bridging oxygen atoms at the temperature of ion exchange can be obtained by the use of ions which are known to behave like alumina, in that they remove non-bridging oxygen atoms from alkali silicates. These ions include hafnium, tantalum, niobium, and zirconium which, because of their large positive charge, have a high field strength and remove non-bridging atoms from the system in spite of their large size. Also included are the small ions such as zinc, beryllium, magnesium, or calcium, which remove non-bridging oxygen atoms in the process of attaining tetrahedral coordination. Although hafnium and tantalum are not likely to be used extensively because of their cost, the efficacy of tantalum is illustrated in Table 4, along with the efficacy of the small ions. The temperature (Temp.) at which each ion exchange was conducted for two hours in a bath of molten AgCl is recorded in the table.

TABLE 4

| Sample | (Amount in Cation Percent) | | | | |
|---|---|---|---|---|---|
| | 18 | 19 | 20 | 21 | 22 |
| $SiO_2$ | 35.00 | 35.00 | 35.00 | 35.00 | 35.00 |
| $Al_2O_3$ | 27.50 | 30.00 | 30.00 | 27.00 | 25.00 |
| $Ta_2O_5$ | — | — | — | 5.00 | 7.50 |
| ZnO | 5.00 | 2.25 | — | — | — |
| MgO | — | — | 2.50 | — | — |
| $Na_2O$ | 16.25 | 10.00 | 16.25 | 8.00 | 8.00 |
| $K_2O$ | 16.25 | 22.75 | 16.25 | 25.00 | 24.50 |
| Temp. | 500 | 675 | 675 | 750 | 750 |
| NBO | 0.000 | 0.054 | 0.056 | 0.007 | 0.000 |
| Color | yellow | black | black | yellow | yellow |

The efficacy of magnesium, gallium, yttrium, lanthanum, hafnium, and niobium, in glasses ion exchanged in the low temperature regime is documented in Table 5. Magnesium in the low temperature regime, in contrast to the high temperature regime illustrated in Table 4, is quite effective in removing non-bridging oxygen atoms. Surprisingly, even strontium, which is almost as large as barium, while being associated with more coloration than observed in glass #23, produces no more color than observed in glass #9 in Table 2. Thus, while it does not remove non-bridging oxygens from the system as effectively as MgO, it does not introduce non-bridging oxygens in like manner to BaO. Each of the ion exchange reactions listed in Table 5 was conducted for two hours at 400° C. in a bath of molten AgCl.

TABLE 5

| Sample | (Amount in Cation Percent) | | | | | | |
|---|---|---|---|---|---|---|---|
| | 23 | 24 | 25 | 26 | 27 | 28 | 29 |
| $SiO_2$ | 35.00 | 35.00 | 35.00 | 35.00 | 35.00 | 35.00 | 35.00 |
| $Al_2O_3$ | 30.00 | 30.00 | 30.00 | 30.00 | 30.00 | 30.00 | 30.00 |
| $Na_2O$ | 32.50 | 32.50 | 32.50 | 32.50 | 32.50 | 32.50 | 32.50 |
| MgO | 2.50 | 0.000 | 0.000 | 0.000 | 0.000 | 0.000 | 0.000 |
| SrO | 0.000 | 2.50 | 0.000 | 0.000 | 0.000 | 0.000 | 0.000 |
| $Y_2O_3$ | 0.000 | 0.000 | 2.50 | 0.000 | 0.000 | 0.000 | 0.000 |
| $Ga_2O_3$ | 0.000 | 0.000 | 0.000 | 2.50 | 0.000 | 0.000 | 0.000 |
| $Nb_2O_5$ | 0.000 | 0.000 | 0.000 | 0.000 | 2.50 | 0.000 | 0.000 |
| $HfO_2$ | 0.000 | 0.000 | 0.000 | 0.000 | 0.000 | 2.50 | 0.000 |
| $La_2O_3$ | 0.000 | 0.000 | 0.000 | 0.000 | 0.000 | 0.000 | 2.50 |
| NBO | 0.000 | 0.060 | 0.000 | 0.000 | 0.000 | 0.000 | 0.000 |
| λ(0.5) | 365 | 380 | 360 | 360 | 365 | 390 | 360 |
| Color | clear | yellow | clear | clear | clear | yellow | clear |

Whereas in the above examples a bath of a molten silver salt(s) was employed as an external source of Ag+ ions, it will be appreciated that other means, such as ion implantation, may be used to provide the external source of Ag+ ions.

We claim:

1. An essentially colorless, alkali metal oxide-$Al_2O_3$ and/or $B_2O_3$-$SiO_2$ glass, wherein at least a portion thereof contains silver ions produced through an ion exchange reaction wherein Ag+ ions from an external source are exchanged with alkali metal ions in the glass, said glass having a base composition in which the alkali metal oxide and the $Al_2O_3$ and/or $B_2O_3$ are present in such concentrations that the glass possesses at atomic structure in which the fraction of non-bridging oxygen atoms is less than 0.03, and wherein up to a total of 7.5 cation percent $Al_2O_3$ and/or $B_2O_3$ can be replaced with at least one metal oxide selected from the group consisting of BeO, CaO, $Ga_2O_3$, $La_2O_3$, MgO, $Nb_2O_5$, $Ta_2O_5$, $Yb_2O_3$, ZnO, and $ZrO_2$, while maintaining the fraction of non-bridging oxygen atoms at less than 0.03.

2. A glass according to claim 1 wherein the concentration of $Ag^+$ ions is varied across a portion of said glass to produce a refractive index gradient therein.

3. A method for making an essentially colorless, silver-containing, alkali metal oxide-$Al_2O_3$ and/or $B_2O_3$-$SiO_2$ glass article comprising the steps of:
(a) forming a glass article having a base composition in the alkali metal oxide-$Al_2O_3$ and/or $B_2O_3$-$SiO_2$ system wherein the alkali metal oxide and $Al_2O_3$ and/or $B_2O_3$ are present in such concentrations that the glass possesses an atomic structure in which the fraction of non-bridging oxygen atoms is less than 0.03, and wherein up to a total of 7.5 cation percent $Al_2O_3$ and/or $B_2O_3$ can be replaced with at least one metal oxide selected from the group consisting of BeO, CaO, $Ga_2O_3$, $La_2O_3$, MgO, $Nb_2O_5$, $Ta_2O_5$, $Yb_2O_3$, ZnO, and $ZrO_2$, while maintaining the fraction of non-bridging oxygen atoms at less than 0.03; and then
(b) contacting said article with an external source of $Ag^+$ ions at a temperature of about 350°–750° C. for a sufficient period of time to replace at least a portion of the alkali metal ions with $Ag^+$ ions on a one-for-one basis.

4. A method according to claim 3 wherein said contact is made at a temperature of about 400°–600° C. for a period of time of about 2–24 hours.

5. A method for producing refractive index gradient in an essentially colorless alkali metal oxide-$Al_2O_3$ and/or $B_2O_3$-$SiO_2$ glass having a base composition in which the alkali metal oxide and the $Al_2O_3$ and/or $B_2O_3$ are present in such concentrations that the glass possesses at atomic structure wherein the fraction of non-bridging oxygen atoms is less than 0.03 comprising the steps of:
(a) forming a glass article having a base composition in the alkali metal oxide-$Al_2O_3$ and/or $B_2O_3$-$SiO_2$ system in which the alkali metal oxide and $Al_2O_3$ and/or $B_2O_3$ are present in such concentrations that the glass possesses at atomic structure wherein the fraction of non-bridging oxygen atoms is less than 0.03, and wherein up to a total of 7.5 cation percent $Al_2O_3$ and/or $B_2O_3$ can be replaced with at least one metal oxide selected from the group consisting of BeO, CaO, $Ga_2O_3$, $La_2O_3$, MgO, $Nb_2O_5$, $Ta_2O_5$, $Yb_2O_3$, ZnO, and $ZrO_2$, while maintaining the fraction of non-bridging oxygen atoms at less than 0.03; and then
(b) contacting a portion of said article with an external source of $Ag^+$ ions at a temperature of about 350°14 750° C. to replace at least a portion of the alkali metal ions with $Ag^+$ ions on a none-for-one basis, the time of contact being varied across said portion.

6. A method according to claim 5 wherein $Ag^+$ ions from said external source are provided through a bath of a molten silver salt or through ion implantation.

7. A component for use in a fiber optic device utilizing a substrate consisting of an essentially colorless alkali metal oxide-$Al_2O_3$ and/or $B_2O_3$-$SiO_2$ glass wherein at least a portion thereof contains silver ions produced through an ion exchange reaction in which $Ag^+$ ions from an external source are exchanged with alkali metal ions in the glass, said glass having a base composition wherein the alkali metal oxide and the $Al_2O_3$ and/or $B_2O_3$ are present in such concentrations that the glass possesses an atomic structure in which the fraction of non-bridging oxygen atoms is less than 0.03, and wherein up to a total of 7.5 cation percent $Al_2O_33$ and/or $B_2O_3$ can be replaced with at least one metal oxide selected from the group consisting of BeO, CaO, $Ga_2O_3$, $La_2O_3$, MgO, $Nb_2O_5$, $Yb_2O_3$, ZnO, and $ZrO_2$, while maintaining the fraction of non-bridging oxygen atoms at less than 0.03.

8. A component according to claim 7 wherein the concentration of $Ag^+$ ions is varied across a portion of said glass to produce a refractive index gradient therein.

* * * * *

UNITED STATES PATENT AND TRADEMARK OFFICE
CERTIFICATE OF CORRECTION

PATENT NO. : 5,007,948

DATED : April 16, 1991

INVENTOR(S) : ROGER J. ARAUJO

It is certified that error appears in the above-identified patent and that said Letters Patent is hereby corrected as shown below:

In the Abstract, line 2, "meal" should read --metal--.

Col. 2, line 33, "$B_2O_3SiO_2$" should read --$B_2O_3$-$SiO_2$--.

Col. 10, line 61, "at atomic" should read --an atomic--.

Col. 11, line 32$^{33}$, "at atomic" should read --an atomic--.

Col. 11, line 39, "at atomic" should read --an atomic--.

Col. 12, line 11, "$350°14\ 750°C$, should read --$350°-750°C$--.

Col. 12, line 12, "none-for-one" should read --one-for-one--.

UNITED STATES PATENT AND TRADEMARK OFFICE
CERTIFICATE OF CORRECTION

PATENT NO. : 5,007,948

DATED : April 16, 1991

INVENTOR(S) : Roger J. Araujo

It is certified that error appears in the above-identified patent and that said Letters Patent is hereby corrected as shown below:

Col. 12, line 30, "$Al_2O_33$" should read --$Al_2O_3$--.

Col. 12, line 33, after "$Nb_2O_5$" insert --$Ta_2O_5$--.

Signed and Sealed this

First Day of September, 1992

Attest:

DOUGLAS B. COMER

Attesting Officer

Acting Commissioner of Patents and Trademarks